United States Patent Office 3,233,330
Patented Feb. 8, 1966

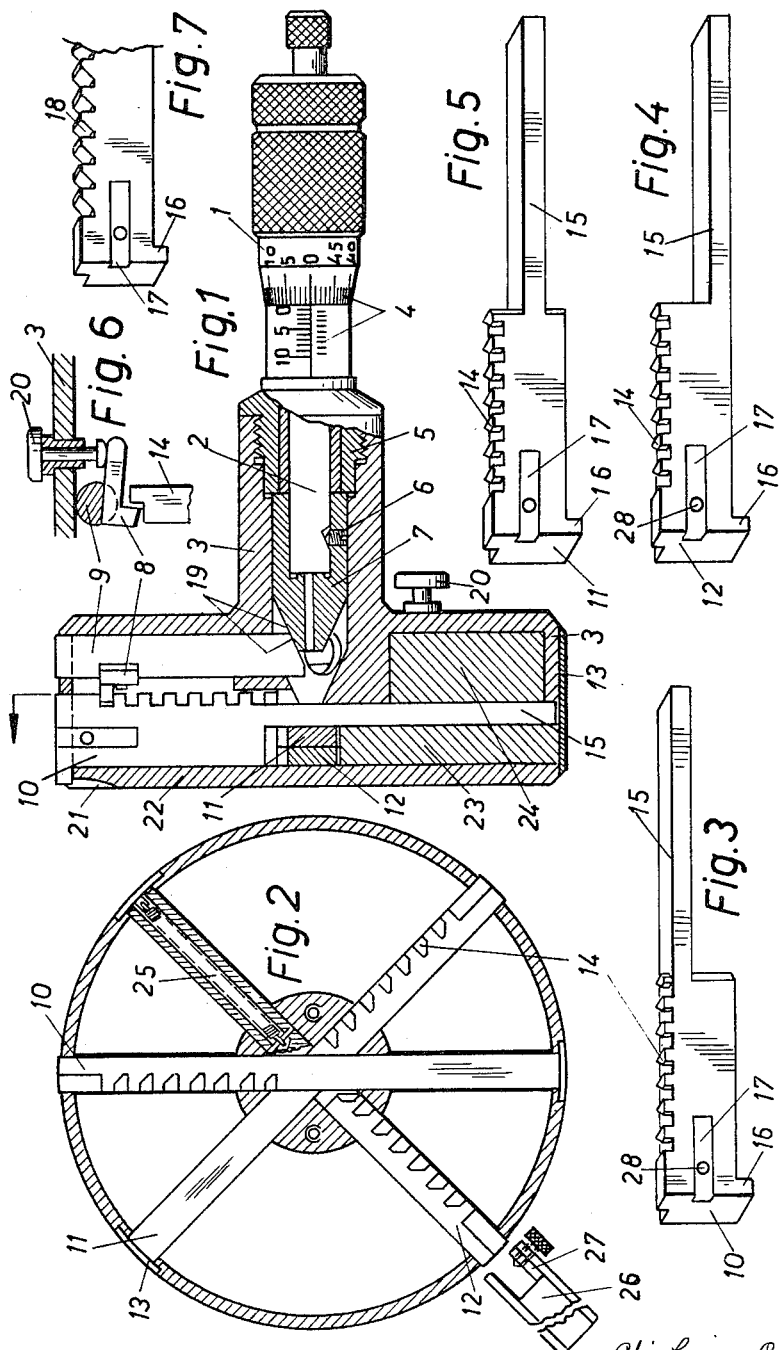

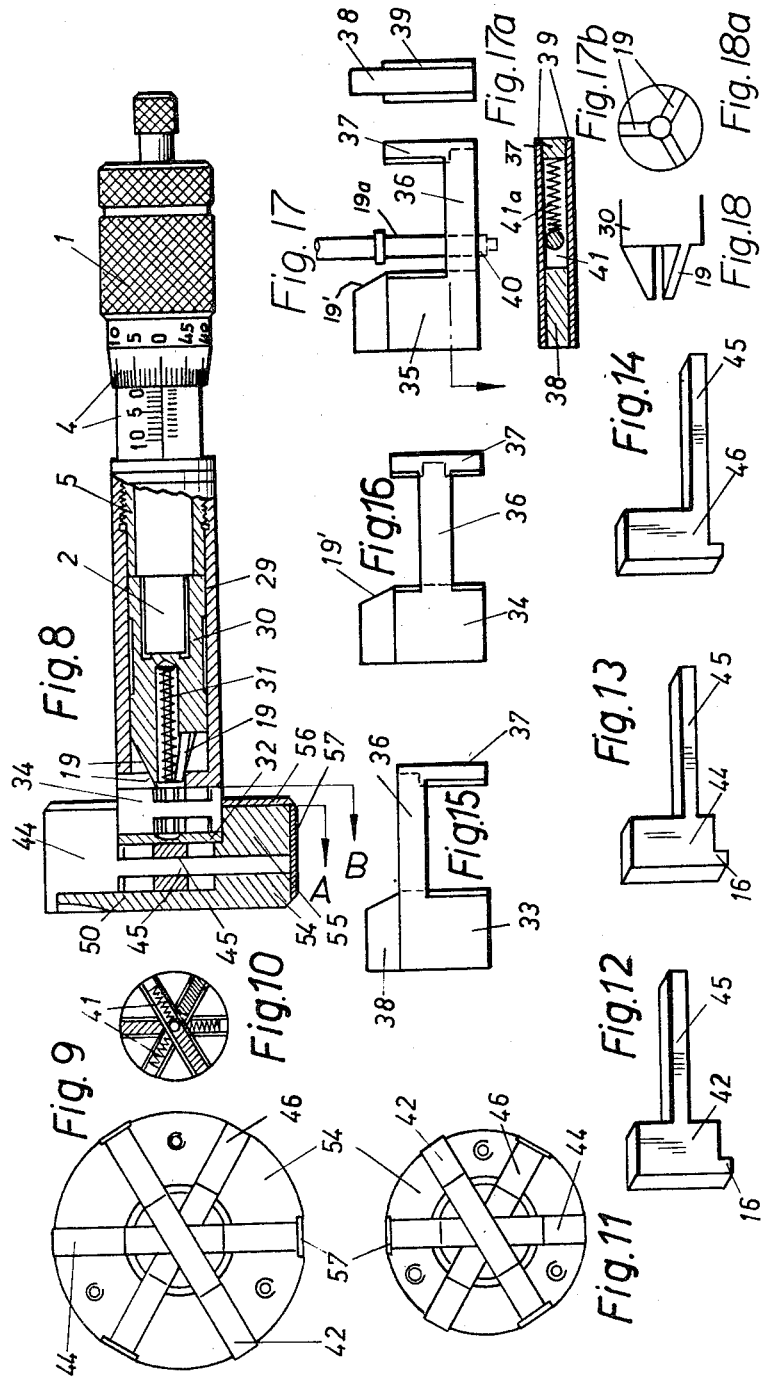

3,233,330
MICROMETER FOR INNER MEASUREMENTS
Chi Liang Cho, 127 Feldblumenstrasse,
Zurich, Switzerland
Filed Nov. 29, 1961, Ser. No. 155,697
13 Claims. (Cl. 33—178)

Micrometers for measuring internal diameters are usually based on two different systems: the system with two measuring points and the system with three measuring points. It is well known that the latter is the best and the only one which gives good accuracy. On the contrary no exact measurement or control can be obtained for the diameter or true running of borings with the two points system, the reason being that the center of bore holes frequently varies, even with self-centering devices.

Another advantage of the three points system over the two points one is that it is possible to have a double measuring range with the same transmission unit: in the three points system the calipers are extended radially on all sides. On the two points system on the contrary, they are extended on one side only in the direction of the diameter.

Unfortunately the usual three points internal diameter measuring micrometers have the disadvantage that each measuring element has a very limited measuring range. For instance, 10 measuring elements are necessary for measuring borings in the range between 20 and 100 mm. The main reason for this is the fact that the feeler guides cannot be made long enough because, due to the difficulty of the crossing over of the feelers, less than half of the diameter can be used for the guides. Thus the feelers can travel on a very short path only. Jamming and unwelcomed displacements appear as soon as the feelers are extended too far and this ruins the measuring accuracy. On the other hand the radial movement of the feelers is produced by the oblique surfaces on the feelers and on the transmission cone by moving the micrometer drum axially. The smaller the angle, the better the precision because the radial movement of the feelers is then shorter, e.g. the measuring range of each measuring element is further reduced. Furthermore the contact surfaces of the feelers and transmission cone are oblique surfaces and are thus very sensitive to a vertical change of position. In the case of the two measuring points system, one feeler, which is unmovable, can be lengthened in order to obtain a larger measuring range. On the contrary all three feelers are movable in the three points system so that a lengthening would cause jamming and unwelcome movements during measuring. The systems in use at present are thus in principle inappropriate for large ranges because of the shortness of the guides and also because the feelers are too short to allow a safe fastening of a lengthening piece thereto.

The following invention has been developed to obviate those disadvantages:

It is a micrometer for measuring internal diameters with three extendable measuring feelers. The three measuring feelers are mounted across the whole diameter of the feeler drum in order to obtain the longest possible travelling range. Moreover the lengthened guide portions of the three feelers are at different levels relative to each other in order to allow them to cross each other. The feelers are equipped with stop cams spaced along the length thereof and are urged radially outwardly by a latch on a second parallel feeler directly in contact with the transmission cone. This permits covering a much longer travelling path.

A micrometer must be manufactured with precision and must have a first class guiding system. At least 70% of the radius length of the feeler drum must guide the feeler when the feeler reaches the external measuring position. On top of this the transmission cone needs about 10% of the radius so that only 20% remains for the travel path of the feelers. On the contrary, in the case of the invention the complete guiding of the feelers for the whole diameter allows the extension of their travel path to 80 to 90% of the radius at least. In this way, about 110–120% of the radius length is guided as against 70% in the case of conventional instruments. This means in other words more safety and more accurate measuring. Furthermore the feelers are not directly in contact with the oblique face of the cone so that a bigger clearance is allowed without loss of precision, and so that also no influence due to unavoidable trembling during measurement is noticeable. Due to that insensitivity, a higher accuracy is obtained with the present invention for a given manufacturing precision. It is possible to lengthen each feeler of the new device for large dimensions measurements without any loss of precision thanks to the long guiding and insensitivity. Further advantages are for instance the knee cut at the tip of the feeler allowing perfect measurement of blind holes. The measurement of such borings with the usual micrometers which are equipped with oblique standing calipers was usually affected by an unavoidable trembling.

All the mentioned advantages show the value of the invention and especially its commercial advantages owing to the possibility of measuring a much larger range of diameters with one micrometer.

The drawings show a few embodiments of different types of micrometers based on the invention.

In the drawings:

FIGURE 1 is a side elevation view partly in section, of a micrometer for measuring internal diameters according to the invention;

FIGURE 2 is a cross-section of the feeler drum taken along line 2—2 of FIG. 1;

FIGURES 3–5 are perspective views of three measuring feelers with the staggered guide portions and chamfered stop cams;

FIGURE 6 is a sectional view of a release device and push button;

FIGURE 7 is a partial perspective view of a feeler with modified chamfered stop cams;

FIGURE 8 is a side elevation view, partly in section, of a micrometer for measuring small internal diameters with a feeler holder thereon for medium size bores;

FIGURE 9 is a plan view of a feeler holder with the cover removed, for measuring intermediate size internal diameters, for instance diameters from 50 to 60 mm.;

FIGURE 10 is a cross-section along line 10—10 of FIG. 8;

FIGURE 11 is a plan view of a feeler holder with the cover removed for measuring intermediate size diameters from 40 to 50 mm.;

FIGURES 12 to 14 are perspective views of three feelers with staggered guide portions for a feeler holder as shown in FIGURE 11;

FIGURES 15 to 17 are side elevation views, from an enlarged scale, of three feelers with staggered guide portions for a micrometer as shown in FIGURE 8;

FIGURE 17a is an end elevation view of the feeler shown in FIG. 17;

FIGURE 17b is a sectional view taken along line 17b—17b of the FIGURE 17; and

FIGURES 18 and 18a are side and end views respectively of a transmission cone with its wedge shaped edges.

Referring to FIGS. 1 and 2, the micrometer is composed of a drum shaped feeler casing 3, a transmission cone 7 and a built-in micrometer drum 1. The usual graduations 4 and measuring spindle 2 are shown. The transmission cone 7 is fixed by screw 6 on spindle 2. Two layers of three feelers each are disposed in the feeler casing. The portion of casing 3 most remote from drum 1 contains the direct measuring feelers 10, 11 and 12 each having a long guide portion 15. The guide portions are staggered at different positions with respect to the spacing along the central axis of the casing in order to have enough room for them to cross each other (see FIGURES 3–5). The measuring feelers 10, 11, 12 slide in diametral grooves in the casing, and the guide portions are guided by the pieces 23, 24. In the middle of each feeler guide portion 15 is a long hole containing a spring 25 attached to a cover plate 13 over the end of the groove in which portion 15 is guided that constantly pulls the feelers towards the inside of the casing and against the cover plate. The upper edges of the measuring feelers 10, 11, 12 are equipped with a row of stop cams 14 spaced according to the measure units. These stop cams are chamfered either on their lateral or upper side. An intermediate feeler 9 for each feeler 10, 11, 12 runs parallel to the side of the feeler having the stop cams 14 and is in direct contact with the transmission cone 7. The oblique surface 19 of the transmission cone 7 and parallel feeler 9 are exactly adjusted: their angle to the cone axis is for instance 26°33'52" on the drawing. Each feeler 9 thus moves radially half the distance the cones move axially, so that the overall increase in diameter of the micrometer at the casing 3 is equal to that of the transmission cone. This system can be mounted without modification on any normal built-in micrometer. The angle of the oblique surface 19 may also be chosen much smaller with corresponding modification of the graduation scale 4, allowing thus a much greater precision. As is known, the travel of feelers working together with the transmission cone is very short. In order to obviate those difficuties in the new invention, the position of the parallel feelers relative to measuring feelers 10, 11, 12 can be varied in successive steps by latch 8 in such a way that the hook-shaped tip of latch 8, which is secured on intermediate feelers 9 and swivel mounted under the action of a spring, is always in engagement with the stop cams 14 of the measuring feelers. In this way, any movement of the transmission cone 7 is transmitted to the parallel feelers 9 and then to the measuring feelers 10, 11, 12 until a measuring feeler shifting is accomplished. The hook shaped tip of latch 8 is chamfered in such a way that its shape corresponds to that of the stop cams. When the measuring feelers are drawn outwards, it is automatically deflected until it snaps behind the desired stop cam.

The numbers corresponding to the diameters related to each measuring range are engraved on the back side (therefore not to be seen on the drawing) of each scala step of the measuring feelers. The casing 3 is equipped with a shiftable push button 20 for engaging latch 8 to release the extended feelers. Pushing the button allows latch 8 and feeler 9 to slew so that the hook shaped tip of the latch frees the stop cam 14 of the measuring feeler which slides back inside the casing under the action of spring 25. The stop cam can also be chamfered on the top front side 18 like FIGURE 7 shows. The latch is adapted to this chamfer and secured to the feeler with a spring or with a second latch biased by a spring and secured on the first one. This latch is swivel mounted so that it can engage or disengage from the stop cams, having thus a spring action. The spring or latch is disengaged from the stop cam by means of an intermediate lever by pushing button 20.

The measuring feelers 10, 11, 12 have a mortise 17 milled at their extremity in order to allow the attachment of the lengthening piece 26. This lengthening piece has the same profile as the measuring feeler but has side pieces which form a claw. This claw secures the lengthening piece on the feeler: when the peg 27 fixed on the claw is positioned in mortise 17 and the screw 27a is threaded into the oblique shaped funnel 28, the bottom of which is not exactly in front of the screw, so that the lengthening piece is pressed against the feeler. A knee 16 is provided at the tip of each feeler 10, 11, 12 for the measuring of blind holes. Openings 21 on lid 22 at the end of each feeler allow sliding the feelers out easily with the finger tips.

FIGURE 8 shows a standard micrometer for small borings and a feeler holder 54 for measuring the internal diameters of medium size borings.

The standard micrometer with this feeler holder attached thereto allows a relatively long travelling of the feelers although its overall diameter is small. This result has been obtained thanks to the guiding of the feelers for most of the feeler holder diameter, which is not possible with the usual micrometers.

The angle of contact of the oblique face 19 of the measuring feelers 33–35 and of the transmission cone 30 must be as low as possible in order to avoid a moment of rotation on the feelers. The cone travels freely to the base plate 32 if the maximum travelling range of the feelers is to be obtained. To this end the transmission cone 30 has three legs 19 with the outer surfaces angled as shown in FIGURE 18, and the three measuring feelers each have a channel 41 in their center between legs 34, FIGS. 17, 17a and 17b, so that the feelers can slide laterally even when one of the legs 19 has penetrated into channel 41 between legs 39 when the cone moves forward. This channel also contains a buffer spring 41a which is connected between end piece 37 and post 19a on the end of spindle 2 and which draws the feelers toward the inside of the casing. The transmission cone 30 must not be secured to measurement spindle 2, but is merely abutted thereby, because otherwise a rotating of the measurement spindle would rotate the cone and legs 19 would not move in only one path.

A channel with a buffer spring 31 is located in the center of the cone 30 and maintains the right contact pressure between the transmission cone and the measuring spindle.

The feelers 33–35 are, for practical and economical reasons, made up of four different pieces: feeler head 38 with chamfered surface 19', a side plate 39 on each side of head 38 which is extended to form guide portion 36, and end piece 37, all fixed together in such a way that the channel 41 is formed in the center.

FIGURES 9 and 11 show medium size feeler holders which can be mounted directly on a standard micrometer in such a way that the feelers 33, 34 and 35 act on the medium size feelers 42, 44 and 46 respectively shown in FIGS. 12, 13 and 14 each having a guide portion staggered in the same manner as guide portions 15 in FIGS. 3–5. Feelers 42, 44, 46 each have a long channel therein with a draw spring in the elongated guide portion, the same as feelers 10, 11, and 12 of the embodiment of FIGS. 1–7. This spring is fixed to cover plate 57 over the end of the guide channel in which the feeler slides and pulls the feelers toward the center of the casing. It also presses the feelers against the feelers 33–35. Lid 56 is secured by a screw to feeler holder 54 and forms the upper guiding surface for the feelers together with four edged piece 55. The bottom of feeler holder 54 forms the bottom guiding surface for the feelers 42, 44 and 46. Measuring feelers 44, and 46 have no stop cams, each feeler unit corresponding to one measuring unit only.

The measuring unit is the translation displacement produced by the transmission cone 7 acting on the feeler unit when the cone effects its maximum stroke. A 5 mm. radial movement, i.e. a 10 mm. diametral movement, is usually employed. This corresponds to the axial travel of the measurement spindle of the micrometers common in the art.

I claim:
1. A micrometer for measuring internal diameters, comprising a feeler casing having a plurality of diametraly extending guide channels therein, said guide channels being equiangularly spaced around said feeler casing, a measuring feeler slidably mounted in each guide channel and having a guide portion thereon, each guide portion being at a different position on its respective feeler with respect to the spacing along the central axis of said feeler casing for leaving room for the guide portions to cross each other at the center of the feeler casing, said feeler casing further having a plurality of radially extending guide channels therein extending parallel to said diametrally extending guide channels and displaced from said diametrally extending guide channels in the direction of the axis of the casing, an intermediate feeler in each of said radially extending guide channels engaged with the measuring feeler in the corresponding diametral channel, a transmission cone engaged with the inner ends of said intermediate feelers, and a micrometer drum engaged with said transmission cone and driving said transmission axially of said feeler casing for moving said intermediate feelers radially and said measuring feelers diametrally.

2. A micrometer as claimed in claim 1 in which one feeler of each pair of corresponding measuring feelers and intermediate feelers has a latch thereon and the other feeler of the pair has an engagement abutment thereon engaged by said latch, and means on said casing for actuating said latch for disengaging the feelers in a pair.

3. A micrometer as claimed in claim 2 in which each measuring feeler is spring loaded to a position in which it is withdrawn into the casing, said abutments being on said measuring feelers, whereby when said latch actuating means on said casing disengages said latches from the abutments on said measuring feelers, said measuring feelers are withdrawn into the casing.

4. A micrometer as claimed in claim 2 in which the other feeler is the measuring feeler and there are a plurality of abutments on the said measuring feeler and said latch being spring loaded into engagement with the abutments, whereby the said measuring feeler can be moved relative to the intermediate feeler to a position close to thhe diameter to be measured and the latch engaged with the abutment next adjacent thereto, after which further movement of the said measuring feeler is caused by the transmission cone driving the intermediate feeler.

5. A micrometer as claimed in claim 4 in which the said abutments are chamfered and cooperate with the latch for permitting the measuring feeler to be drawn outwardly of the casing and the latch to be moved by the passage of the abutments thereover.

6. A micrometer as claimed in claim 5 in which the chamfered surface on the abutments faces laterally of the feeler and the latch has a cooperating chamfered surface facing laterally of the feeler.

7. A micrometer as claimed in claim 5 in which the chamfered surface on the abutment faces in the axial direction of the casing, and the latch has a cooperating chamfered surface also facing axially of the casing.

8. A micrometer as claimed in claim 1 in which each measuring feeler further has a lengthening piece thereon, said lengthening piece having side pieces defining a space therebetween having the same dimension as the end of the feeler, a peg on said lengthening piece extending into said space, the end of said feeler having a mortise therein into which said peg engages for positioning the lengthening piece on the feeler, and a screw through one side piece and the peg and extending into the end of the feeler for securing the lengthening piece to the feeler.

9. A micrometer as claimed in claim 1 in which each guide portion has a longitudinal bore extending into it from the free end of the guide portion, a spring in said bore attached to the inner end of the bore, and a cover plate over the end of each of the guide channels toward which the guide portions on the feelers extend, the other ends of the springs being attached to the respective cover plates, whereby the feelers are biased toward the position in which they are withdrawn into the casing.

10. A micrometer as claimed in claim 1 in which each feeler has a knee thereon for enabling the micrometer to be used for measuring blind holes.

11. A micrometer as claimed in claim 1 in which said measuring feelers each have a projection thereon extending over the end of the corresponding intermediate feeler by which said intermediate feelers are engaged with said measuring feelers.

12. A micrometer as claimed in claim 1 in which each intermediate feeler has an opening therein elongated in the direction of the length of the feeler and extending through the guide portion thereof in the axial direction of the casing, a pin extending axially of the casing, a spring in each opening extending from said pin to the end of the guide portion remote from the direction in which said intermediate feelers are extended by said transmission cone, said transmission cone having a plurality of legs thereon with the outer surfaces angled and bearing on the intermediate feelers and having a thickness sufficient to allow them to pass through the elongated openings in said intermediate feelers, and said transmission cone and said micrometer drum being in a simple abutting relationship permitting rotation of the micrometer drum relative to the transmission cone.

13. An attachment for a micrometer for measuring internal diameters, the micrometer being of the type having a head with a plurality of feelers extending radially of the head in radially extending channels in the head, said attachment comprising a feeler casing having a plurality of diametrally extending guide channels therein, said guide channels being equiangularly spaced around said feeler casing and corresponding in number to the number of feelers in the micrometer, and a measuring feeler slidably mounted in each guide channel and having a guide portion thereon, each guide portion being at a different position on its respective feeler with respect to the spacing along the central axis of said feeler casing for leaving room for the guide portions to cross each other at the center of the feeler casing, said measuring feelers each having a projection thereon adapted to project over the ends of the feelers in the micrometer head when the casing is fitted over the micrometer head, whereby when the attachment is fitted onto the micrometer head with the measurement feelers aligned with the feelers in the micrometer head, the movement of the feelers in the micrometer head is transmitted to the measuring feelers of the attachment.

References Cited by the Examiner

UNITED STATES PATENTS 2,566,160  8/1951  Bowers _____ 33—164
2,881,529  4/1959  Roch _____ 33—178

ISAAC LISANN, *Primary Examiner.*